United States Patent

[11] 3,616,381

[72] Inventors  Leonard D. Krenzke
 Riverdale;
 Glenn O. Michaels, South Holland, both of Ill.
[21] Appl. No. 853,033
[22] Filed Aug. 26, 1969
[45] Patented Oct. 26, 1971
[73] Assignee Atlantic Richfield Company
 New York, N.Y.

[54] DEHYDROGENATION OF HYDROCARBONS IN AN ELECTRIC FIELD
11 Claims, 1 Drawing Fig.

[52] U.S. Cl. .................................................. 204/168, 204/312
[51] Int. Cl. ............................................ C07b 29/06, B01k 1/00
[50] Field of Search ........................................ 204/168, 170; 260/683.3

[56] References Cited

UNITED STATES PATENTS

| | | | |
|---|---|---|---|
| 2,172,534 | 4/1939 | Grosse | 260/683.3 |
| 2,227,639 | 1/1941 | Frey et al. | 260/683.3 |
| 3,189,661 | 6/1965 | Mulaskey et al. | 260/680 |
| 3,363,023 | 1/1968 | Mooi et al. | 260/683.3 |

FOREIGN PATENTS

| | | | |
|---|---|---|---|
| 294,099 | 6/1929 | Great Britain | 204/168 |
| 295,705 | 1929 | Great Britain | 204/168 |
| 807,509 | 1/1937 | France | 204/168 |
| 835,288 | 12/1938 | France | 204/168 |
| 601,641 | 12/1931 | Germany | 204/168 |

Primary Examiner—F. C. Edmundson
Attorney—Morton, Bernard, Brown, Roberts & Sutherland ABSTRACT: An improvement in a process for the catalytic dehydrogenation of dehydrogenatable hydrocarbon feedstocks to form compounds having a higher carbon to hydrogen ratio is disclosed. The process is carried out while subjecting the solid catalyst, which contains a group VIb metal oxide, to a high-voltage electrical field of at least about 1000 volts/cm.

PATENTED OCT 26 1971     3,616,381
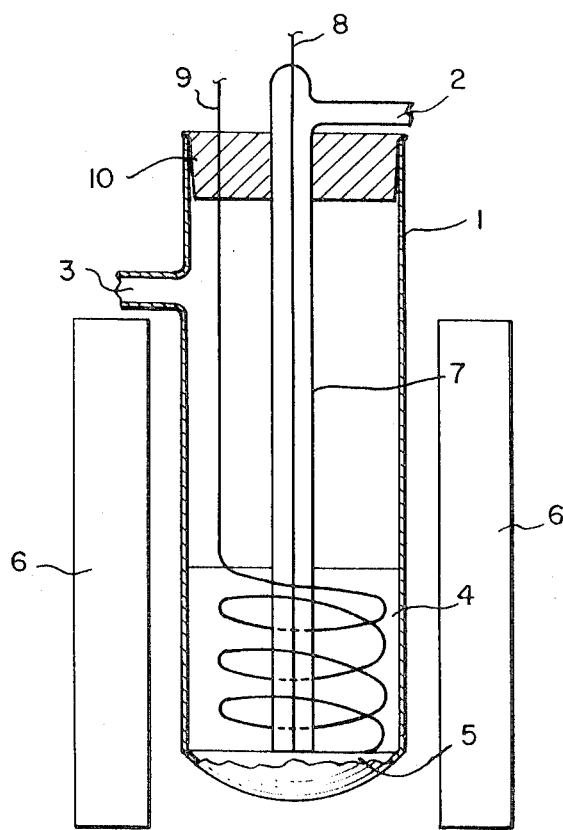
INVENTOR
LEONARD D. KRENZKE &
GLENN O. MICHAELS
BY McLean, Morton & Boustead
ATTORNEYS

DEHYDROGENATION OF HYDROCARBONS IN AN ELECTRIC FIELD

This invention relates to a process for the catalytic dehydrogenation of dehydrogenatable hydrocarbon feedstocks to form products having a higher carbon to hydrogen ratio. More particularly, this invention relates to a process for the dehydrogenation of such hydrocarbons wherein the feedstock is contacted with a dehydrogenation catalyst containing a group VI$b$ metal oxide at a dehydrogenation temperature of from about 900° to 1250° F., and while the catalyst is subjected to a high-voltage electrical field.

Dehydrogenation catalysts having one or more group VI$b$ metal (i.e., chromium, molybdenum and tungsten) oxides on a solid support have been used to dehydrogenate hydrocarbons to more olefinic and/or diolefinic structures. Chromia supported by alumina is the most frequently used catalyst of this type, with the chromia being present in a minor amount of from about 1 to 40 weight percent of the catalyst. Quite frequently, dehydrogenation will be carried out with a catalyst containing from about 10 percent to 20 percent $Cr_2O_3$ carried on a high surface area support such as activated alumina. Commonly, an alkali metal oxide is present in the catalyst in a small amount, of say, 0.1 to 4 weight percent, sufficient to counteract the acid sites on the catalyst to minimize cracking and isomerization reactions. The catalyst further can contain minor amounts of other components such as metal oxides, e.g. zinc oxide or magnesium oxide. These catalysts have been used in such processes as the production of butenes and butadiene from n-butane, isoprene from isopentane or isoamylene, styrene from ethyl benzene and a number of similar dehydrogenation reactions.

The catalyst can, for example, contain $Cr_2O_3$, MgO, alkali metal oxide and alumina as is taught in U.S. Pat. No. 3,363,023. As is disclosed therein, the dehydrogenation catalyst may contain at least about 1 or 5 to 40 weight percent $Cr_2O_3$, about 1 to 40 weight percent MgO, about 0.1 to 4 weight percent alkali metal oxide, and the balance alumina. The MgO can be in oxide form or chemically combined with the alumina base, as for example, a magnesium aluminate spinel. Rather than magnesium oxide, the catalyst can contain, in addition to $Cr_2O_3$, alkali metal oxide and alumina, zinc oxide in a minor amount of, say, about 5 to 40 weight percent which can be provided in oxide form or chemically combined with the alumina base, as for example, a zinc aluminate spinel.

The use of these types of catalysts is also known in the dehydrocyclization of aliphatic hydrocarbons to form aromatic hydrocarbons, see, for example, U.S. Pat. Nos. 2,271,751; 2,357,271; and 2,378,209. This process, which combines dehydrogenation and cyclization, is usually effected at a temperature of from about 900° to 1250° F. With the hydrocarbons in the vapor phase and at a pressure from subatmospheric up to about 2 atmospheres or more.

In accordance with the process of this invention, the dehydrogenation of a hydrocarbon feedstock is performed by contacting the feedstock with a dehydrogenation catalyst of the foregoing described types, while the catalyst is subjected to a high-voltage electrical field sufficient to increase the yield of the dehydrogenated product. The electrical filed can have a strength of above about 1,000 or 5,000 volts/centimeter up to a strength just below the arcing voltage. Preferably, the voltage is from about 8,000 or 12,000 volts/centimeter to about 25,000 volts/centimeter or more. The high-voltage electrical field can be applied using AC, DC or pulsating DC current.

The dehydrogenation process is conducted in the vapor phase at an elevated temperature, for instance, about 900° to 1,250° F., preferably 1,000° to 1,150° F., and a hydrocarbon pressure of up to about 2 atmospheres or more. Generally, increased selectivities are obtained at hydrocarbon pressures below atmospheric, say down to about 0.05 atmosphere or below, with a hydrocarbon pressure of about 0.1 to 0.5 atmosphere being preferred for economic reasons. If desired, an inert diluent or vacuum can be employed to reduce the hydrocarbon partial pressure of the hydrocarbon feed. Various essentially inert, gaseous diluents can be employed but it is preferred to use nitrogen, hydrogen or methane. The inert gas is usually present in an amount of about 0.5 to 50 moles, preferably 5 to 25 moles, per mole of hydrocarbon feed. The contact time or weight hourly space velocity can vary, depending on the temperature and pressure employed but will generally range from about 0.05 to 5, preferably 0.1 to 2 WHSV. The catalyst preferably contains a minor amount of chromia supported on an alumina base.

The catalyst support is generally a porous solid oxide and alumina is preferably the major component of the catalyst. Activated or gamma-family aluminas can be employed such as those derived by calcination of amorphous hydrous alumina, alumina monohydrate, alumina trihydrate or their mixtures, at elevated temperatures of, for instance, about 750° to 1,500° F., preferably about 850° to 1,400° F. Advantageously, the alumina precursor may be a mixture predominating, for instance, about 65 to 95 percent by weight, in one or more of the alumina trihydrates: bayerite, nordstrandite or gibbsite, and about 5 to 35 percent by weight alumina monohydrate (boehmite), amorphous hydrous alumina or their mixtures. Catalyst bases of this type are disclosed in U.S. Pat. Nos. 2,838,444 and 2,838,445. The alumina base may also contain small amounts of other solid oxides. The preparation of a base containing a magnesium aluminate spinal or zinc aluminate spinel is known in the art. For example, a preferred method of obtaining a suitable magnesium aluminate spinel is described in U.S. Pat No. 2,992,191 to Henry Erickson. A preferred method of obtaining a zinc aluminate spinel is described in U.S. Pat. application Ser. No. 550,176, filed May 16, 1966 now U.S. Pat. No. 3,470,262.

Impregnation of the alumina base with the catalytically active metal components can be by known methods. For instance, the base can be mixed with an aqueous solution of a water-soluble salt of the catalytically active components of the catalyst to absorb all or part of the solution in the support which is then dried and calcined, for instance at the temperatures noted above, to give an active catalyst. Alternatively, the active components can be precipitated on the support through neutralization of a slurry of the support and water-soluble compounds of the catalytically active metals and then drying and calcining. Calcination activates the catalyst and, if not already present as the oxide, may convert the catalytically active metal components to their oxide form. The impregnation with the catalytically active components can be done separately or simultaneously.

If desired, the alumina base can be ground before addition of the catalytic metals and the resulting material formed, if desired, into larger particles, impregnated and dried before effecting the calcination which gives the final catalyst. Alternatively the base particles can be directly impregnated, dried and calcined; or directly impregnated, ground and formed into shaped particles by tabletting or extrusion and then calcined. It is preferred to calcine the alumina prior to addition of the catalytically active components. After the catalytically active components are added to the base, the resulting catalyst compositions can be activated by drying and calcination, for instance, at the temperatures noted above.

The hydrocarbon feeds of the present invention are dehydrogenatable hydrocarbons of 2 to about 20 or more carbon atoms, often of about 4 to 5 to 12 carbon atoms. The feeds are usually nonacetylenic and often are saturated or monoolefinically unsaturated hydrocarbons. Whether the reaction or principal reaction occurring is a straight dehydrogenation as opposed to dehydrocyclization, will be dependent in large part upon the feed selected. Both dehydrogenation to create one or two double bond-containing products and dehydrocyclization may occur with some feeds.

Should noncyclic monoolefins and/or diolefins be the desired products the preferred feeds are aliphatic hydrocarbons of 4 to 6 carbon atoms although as aforementioned, they can have up to about 12 or 20 or more carbon atoms. The feeds can be unsaturated but the preferred feeds are the normal and branched chain paraffins, including the cyclic paraffins such as cyclopentane and cyclohexane. Equally suitable are aromatic feeds containing one or more dehydrogenatable aliphatic hydrocarbon groups, e.g. a lower alkyl group say of 1 to 4 carbon atoms as in the case of ethylbenzene. Among the unsaturated feeds which can be used are the olefins of the $C_4$ to $C_6$ range which may undergo dehydrogenation to yield dienes.

The invention will be further described with reference to the appended drawing in which The FIGURE is a schematic representation of one mode of the invention.

The FIGURE shows a reactor cylindrical vessel 1 made of a suitable nonconducting material such as glass with an inlet 2 and an outlet 3. Located in the lower part of the reactor vessel 1 is a catalyst bed 4 composed of a Group VIb metal oxide supported on an alumina base. The catalyst bed 4 is supported on a layer 5 of tabular alumina. The reactor vessel 1 is located within heating means 6 which serve to heat the reactor vessel and contents to a desired temperature. The reactor inlet 2 connects with a tube 7 also made of a suitable nonconducting material such as glass, which is located within the reactor vessel 1, preferably at the center of the vessel, and which extends down to the bottom of the catalyst bed 4. An electrode wire 8 made of a metal such as stainless steel is located within tube 7 nd also extends to the bottom of catalyst bed 4. A second electrode wire 9 enters the reactor vessel 1 through the stopper 10 which seals the top of the reactor vessel and extends downwardly into the catalyst bed 4. The second electrode 9 is preferably formed in a spiral in the catalyst bed 4 around the tube 7 and extends to about the bottom of the catalyst bed 4.

In operation, the reactor vessel 1 (with the catalyst bed 4, tube 7 and electrode wires 8 and 9 therein) is heated by heating means 6 to a temperature of about 900° to 1,250° F., feed is introduced through inlet 2 and a high-voltage electrical source (not shown) is applied between the electrodes 8 and 9. The products are collected from the outlet 3.

The following example further illustrates the process of the instant invention.

EXAMPLE

The reactor vessel of the FIGURE was filled with 7 grams of a regenerated chromia-alumina dehydrogenation catalyst containing about 20 weight percent chromia and about 0.4 weight percent sodium oxide, which had been aged 50 days in a commercial butane dehydrogenation unit. The catalyst was ground to 8–14 mesh and dispersed in the reactor so that it completely covered the spiral of electrode 9. Feed was introduced to the catalyst bed through the tube 7 around electrode 8. The products were collected by conventional means. The conversion of the feed was estimated from gas chromatographic analysis of the effluent taken at intervals throughout a run.

A high voltage DC source was applied between electrodes 8 and 9 and runs were made at different voltage levels (0—15,000 volts.) The voltage was measured with an RCA Senior VoltOhmyst using a high-voltage probe. The measured resistance between the electrodes was 180 and 400 megohms at 1,050° F., depending upon the polarity of the ohmmeter leads.

The reactor was inserted in the furnace and the catalyst was activated for 3 hours at 1,400° F. and the runs were started. The feed for all of the runs was commercially pure isobutane of the following composition:

|  | Wt. % |
|---|---|
| propane | 0.02 |
| isobutane | 99.8 |
| n-butane | 0.17 |

Data on the effect of an electric field on the conversion of isobutane is shown in table I below. The positive potential was applied to electrode 9. The samples taken from the runs using the regenerated catalyst and while the potential was applied, e.g., samples 21, 23, and 25, were taken after the voltage had been applied for about 15 minutes and while the voltage was being applied. Similarly, the samples taken without the potential applied other than the first sample after regeneration, e.g., samples 19, 22 and 24, were taken about 15 minutes after the potential was taken off the catalyst.

TABLE I

|  | Run Number | | | | | | | |
|---|---|---|---|---|---|---|---|---|
|  | 18 | 19 | 20 [1] | 21 | 22 | 23 | 24 | 25 |
| Conditions: | | | | | | | | |
| Temperature, °F | 1,050 | 1,050 | 1,050 | 1,050 | 1,050 | 1,050 | 1,050 | 1,050 |
| WHSV | 0.8 | 0.8 | 1.07 | 1.07 | 1.07 | 1.07 | 1.07 | 1.07 |
| Pressure | [2] | [2] | [2] | [2] | [2] | [2] | [2] | [2] |
| Sampling time (min.) | 10 | 25 | 10 | 35 | 50 | 75 | 90 | 117 |
| Applied potential (D.C. volts) | 10,000 | 0 | 0 | 5,000 | 0 | 10,000 | 0 | 15,000 |
| Analysis of Effluent, wt. percent: | | | | | | | | |
| Hydrogen, methane, ethane and ethene | .23 |  |  | [3] |  | .10 |  | .36 |
| Propane | .23 | .05 | .10 | [3] | .10 | .10 | .09 | .24 |
| Propene | 1.05 | .01 | .10 | .10 | .10 | .31 | .09 | 1.44 |
| Isobutane | 76.74 | 89.21 | 85.02 | 88.60 | 89.89 | 87.01 | 90.75 | 69.46 |
| n-butane | .12 | .10 | .10 | .10 | .10 | .10 | .09 | .12 |
| Isobutene and n-butene | 21.51 | 10.55 | 14.68 | 11.20 | 9.81 | 12.28 | 8.98 | 28.14 |
| trans-Butene | .12 |  |  |  |  | .05 |  | .12 |
| cis-Butene |  |  |  |  |  | .05 |  | .12 |
| Butadiene | [3] |  |  |  |  |  |  |  |
| Estimated conversion of iC₄, wt. percent | 23.3 | 10.9 | 15.0 | 11.40 | 10.1 | 13.0 | 9.25 | 30.5 |

[1] The catalyst was regenerated with air between Runs 19 and 20.
[2] Atmospheric.
[3] Trace.

As may be noted from the table, the conversion of isobutane increased with the application of an electrical field. In particular, the estimated conversion after 10 minutes with an applied potential of 10,000 volts (Run No. 18) was 23.3 percent while the estimated conversion after 10 minutes of the regenerated catalyst with no electrical field was 15.0 percent. This represents an increase in conversion of about 55 percent. With no voltage applied, conversion dropped from 15.0 percent at $t = 10$ min. to 9.25 percent at the end of 90 minutes. With 5,000 volts applied, a small difference in the expected activity was noted. However, with the application of 10,000 volts at $t = 75$ min. the conversion was 13.0 percent or about 3 percent above and about 30 percent greater than the expected value and with 15,000 volts ($t=115$ min.) conversion increased to 30.5 percent. The latter conversion is over 3 times the expected result with no applied voltage.

Although the above runs were made with a direct current source, the potential can be applied with an alternating current source or a pulsating direct current source. The exact mechanism for the enhanced results produced by the application of the electric field is not known but the effects appear similar to those produced in a catalyst by the introduction of a promoter. However, once a promoter is added to a catalyst, the results are more or less permanent since the promoter cannot be removed easily or rapidly. The advantage of using an electrical field to achieve these increased yields is apparent since it can be removed easily.

IT IS CLAIMED:

1. In a method for the conversion of dehydrogenatable hydrocarbon feedstocks to increase the carbon to hydrogen ratio wherein the feedstock is contacted at a temperature of from about 900° to 1,250° F. in the vapor phase over a dehydrogenation catalyst containing a group VI$b$ metal oxide supported on a solid base, the improvement wherein the catalyst is subjected to a high-voltage electrical field of from about 8,000 volts/cm. sufficient to increase the yield of dehydrogenated product but below the arcing voltage.

2. The method of claim 1 wherein the feedstock is isobutane.

3 The method of claim 1 wherein the catalyst has a minor amount of chromia supported on alumina.

4. The method of claim 1 wherein the dehydrogenation is carried out at a hydrocarbon pressure of from about 0.05 to 2 atmospheres.

5. The method of claim 4 wherein the temperature is from about 1,000° to 1,150° F., and the pressure is from about 0.1 to 0.5 atmosphere.

6. The method of claim 1 wherein the electric field is from about 8,000 to 25,000 volts/centimeter.

7. The method of claim 1 wherein the catalyst contains 1 to 40 weight percent chromia, a small amount of an alkali metal oxide and the base is alumina.

8. The method of claim 6 wherein the dehydrogenation is carried out at a hydrocarbon pressure of from about 0.05 to 2 atmospheres.

9. The method of claim 8 wherein the temperature is from about 1,000 to 1,150° F., and the pressure is from about 0.1 to 0.5 atmosphere.

10. The method of claim 9 wherein the catalyst contains 1 to 40 weight percent chromia, a small amount of an alkali metal oxide and the base is alumina.

11. The method of claim 10 wherein the feedstock is isobutane.

* * * * *